United States Patent [19]

Mausner

[11] Patent Number: 4,477,732
[45] Date of Patent: Oct. 16, 1984

[54] SENSOR FOR ACCELERATION

[75] Inventor: Eberhard Mausner, Ludwigsburg, Fed. Rep. of Germany

[73] Assignee: Robert Bosch GmbH, Stuttgart, Fed. Rep. of Germany

[21] Appl. No.: 505,007

[22] Filed: Jun. 16, 1983

[30] Foreign Application Priority Data

Aug. 26, 1982 [DE] Fed. Rep. of Germany ....... 3231800

[51] Int. Cl.³ .................. H01H 35/14; B60R 21/02; G08B 21/00
[52] U.S. Cl. .................................. 307/9; 307/10 R; 307/121; 180/282; 280/727; 280/728; 280/734; 340/52 H
[58] Field of Search ............. 307/9, 10 R, 10 SB, 307/121; 180/268, 282; 280/727, 728, 734; 340/52 H

[56] References Cited

U.S. PATENT DOCUMENTS

| | | | |
|---|---|---|---|
| 3,489,917 | 1/1970 | Gurol | 307/121 |
| 3,905,440 | 9/1975 | Okada et al. | 307/10 SB X |
| 3,909,777 | 9/1975 | Baba et al. | 340/52 H |
| 4,158,191 | 6/1979 | Rogers et al. | 340/52 H |
| 4,166,641 | 9/1979 | Okada et al. | 180/282 X |
| 4,381,829 | 5/1983 | Montraron | 180/282 X |

Primary Examiner—Roy N. Envall, Jr.
Assistant Examiner—Derek Jennings
Attorney, Agent, or Firm—Edwin E. Greigg

[57] ABSTRACT

A sensor serves to detect acceleration, in particular for triggering passenger protection devices (air bags) in motor vehicles. A spring-restrained inertial mass subjected to the acceleration which is to be measured is deflected, and the deflection is detected with respect to a locally fixed reference point. Upon the exceeding of an acceleration threshold, a trigger signal is generated. A mass-restrained body has a first photoconductor, one end of which is acted upon by a light source. Depending upon whether it is in the state of rest or in a state of deflection dependent upon acceleration, the other end of the photoconductor is located opposite one of various photoconductors, which are connected to photo elements.

6 Claims, 6 Drawing Figures

SENSOR FOR ACCELERATION

BACKGROUND OF THE INVENTION

The invention is based on a sensor as generally defined hereinafter.

Sensors for detecting acceleration are already known in many forms. It is also known to embody such sensors and the evaluation circuits associated with them in such a way that they are suitable particularly for measuring decelerations which are transitory in nature and particularly pronounced. Such sensors are required, for instance, to trigger passenger protection devices in motor vehicles having an air bag. An impact sensor of this kind is described in German Offenlegungsschrift No. 28 03 781, for instance, in which a spring-restrained inertial mass exposed to the acceleration to be measured is provided. The sensor in this case has measuring means which enable indirect detection of the deflection of the mass. The exceeding of a threshold value for the deflection is monitored, and when the threshold value is exceeded or is exceeded for a particular period of time, a triggering signal for the passenger protection device is generated.

OBJECT AND SUMMARY OF THE INVENTION

The sensor according to the invention has the advantage that a high signal level is generated, that the sensor apparatus is not subject to aging, and that as a result of the sufficiently small masses, it is also possible to attain small dimensions on the part of the sensor, which result in low production costs.

As a result of the characteristics disclosed hereinafter, advantageous further embodiments of the sensor are possible. A particularly reliable recognition of the exceeding of a predetermined acceleration status is effected in that the duration of the exceeding of a particular deflection of the inertial masses is used as the trigger signal for a passenger protection device.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1A:
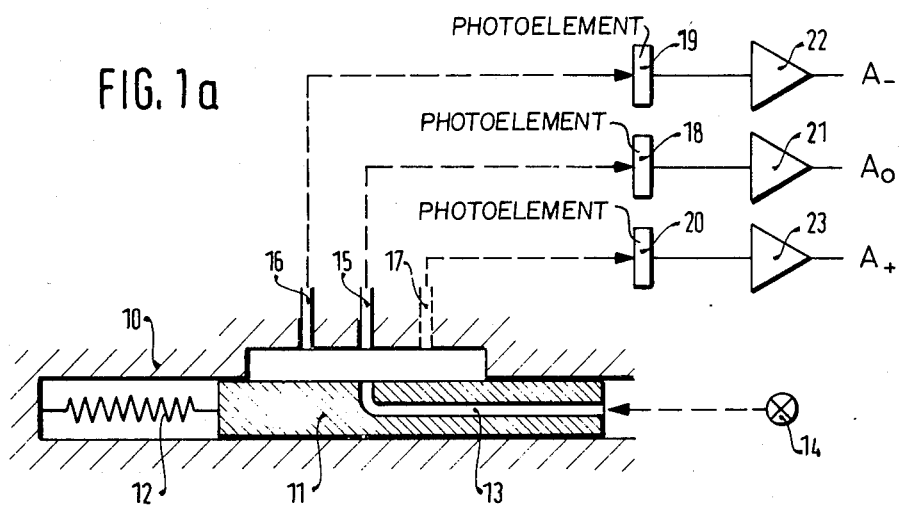
FIGS. 1a and 1b are two schematic illustrations of forms in which a sensor according to the invention may be realized.

In FIG. 1a, 10 indicates a fixed housing, for instance a transducer housing screwed to the chassis of a motor vehicle. A body 11 is movably disposed in a guide of the housing 10 and is supported on the housing 10 via a spring 12. In the exemplary embodiment shown in FIG. 1, the body 11 is preferably movable in the direction in which the acceleration is supposed to be measured; naturally it is understood that movements in various coordinates can be detected in accordance with the present invention. A first photoconductor 13 is disposed in the body 11 and one of its ends is connected to a light source 14. The other end of the first photoconductor 13 is disposed facing a plurality of photoconductors 15, 16, 17 in the housing 10. In the position of rest of the body 11, the first photoconductor 13 is located opposite the second photoconductor 15; upon the occurrence of a negative acceleration (that is, deceleration), the body 11 moves toward the left as seen in FIG. 1, so that upon exceeding a predetermined deceleration, the first photoconductor 13 is located opposite the third photoconductor 16. In a corresponding fashion and in a further embodiment of the invention intended for measuring positive accelerations, a fourth photoconductor 17 may be provided, being located on the side of the second photoconductor 15 opposite the third photoconductor 16, so that upon the occurrence of a predetermined value for positive acceleration, the first photoconductor 13 is located opposite the fourth photoconductor 17. The photoconductors 15, 16, 17 are connected to photo elements 18, 19, 20 and these elements are connected in turn to amplifiers 21, 22, 23.

In the position of rest of the body 11, a resting signal $A_o$ is therefore generated by the amplifier 21. Upon the exceeding of a predetermined deceleration, a signal $A_-$ appears at the amplifier 22 in a corresponding manner, while upon the exceeding of a predetermined positive acceleration, a signal $A_+$ appears at the amplifier 23.

Figure 1B:
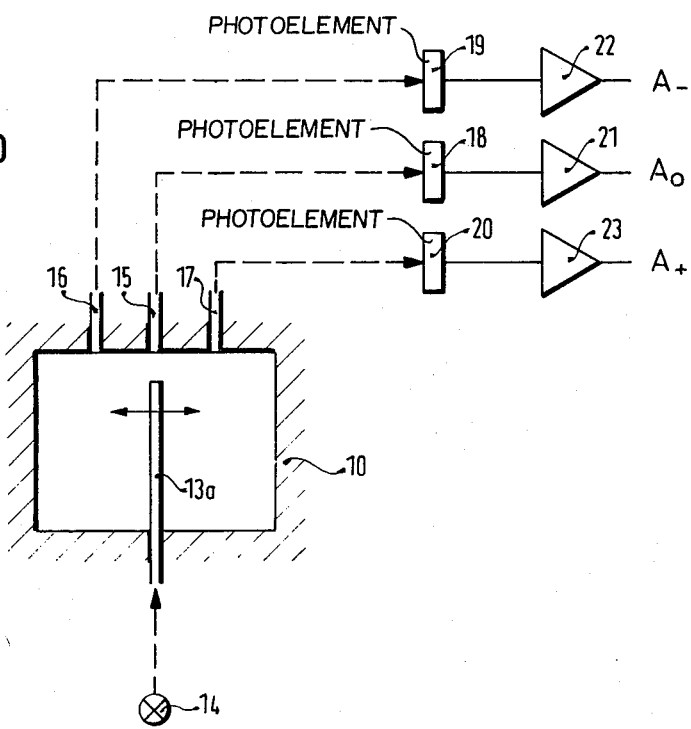

In a further exemplary embodiment as shown in FIG. 1b, a body 11 having restrained mass is not used for converting the acceleration into a linear distance; instead, a first photoconductor 13a itself serves as a spring/mass system. The first photoconductor 13a protrudes into the housing 10 and its free end is deflectable in accordance with acceleration. Otherwise the apparatus shown in FIG. 1b corresponds to that of FIG. 1a, and the same reference numerals are accordingly used.

Figure 2A:
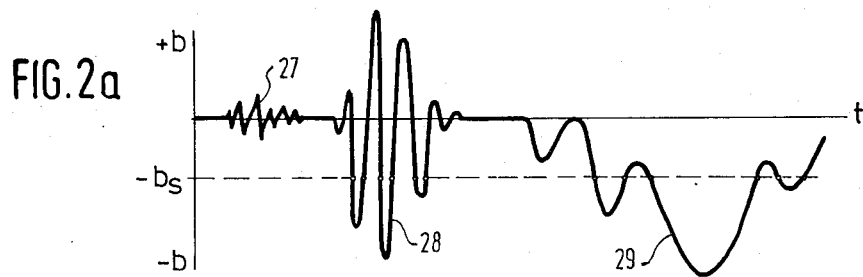
FIGS. 2a-2c illustrate signal curves intended to explain the exemplary embodiment shown in FIG. 1.
Figure 2B:
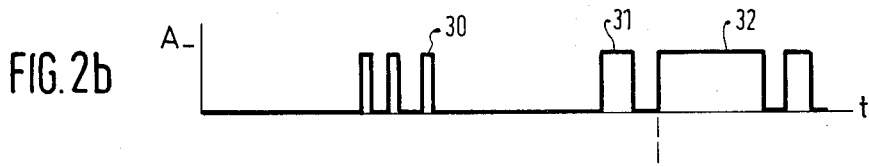

In FIG. 2, various signals or pulses are shown plotted over the time t and are intended to explain the function of the exemplary embodiment according to FIG. 1. In FIG. 2a, various acceleration or deceleration signals are shown. 27 represents a normal interference signal, which has both acceleration components (+b) and deceleration components (−b). If it is desired to recognize the exceeding of a predetermined deceleration threshold value $-b_s$ using the exemplary embodiment of FIG. 1, FIG. 2a shows that this deceleration threshold value $-b_s$ is not exceeded by the interference signal 27. In contrast to this, 28 represents a special interference signal such as may occur, for instance during motor vehicle maintenance or repair, if hammer blows strike the chassis which carries the sensor according to the invention. Although in that case relatively large acceleration or deceleration components will then occur, these components are then of very high frequency, and each occurs quite briefly. FIG. 2b shows the appearance of the signal $A_{31}$, that is, the exceeding of the fixed threshold value for deceleration $-b_s$. An interference corresponding to the signal 28 of FIG. 2a thus produces pulses 30 in FIG. 2b, but by means to be described further below such brief pulses 30 do not generate any trigger signal.

Figure 2C:

In contrast to this, a signal course 29 is shown in FIG. 2a such as typically occurs on the occasion of a motor vehicle accident. Substantial deceleration values then occur, and they are also of longer duration than is the case with an interference 28. In corresponding fashion, a signal $A_-$ occurs and pulses 31, 32 accordingly appear in FIG. 2b. If the length of the pulses 31, 32 is now monitored for whether they exceed a predetermined time period Δt, then FIG. 2c shows that a trigger signal S is not generated until the pulse 32 in FIGS. 2b has appeared, because pulse 32 is the first to exceed the predetermined duration Δt. Thus after the duration Δt has been exceeded, the trigger signal S corresponding to a pulse 33 in FIG. 2c is generated.

Figure 3:
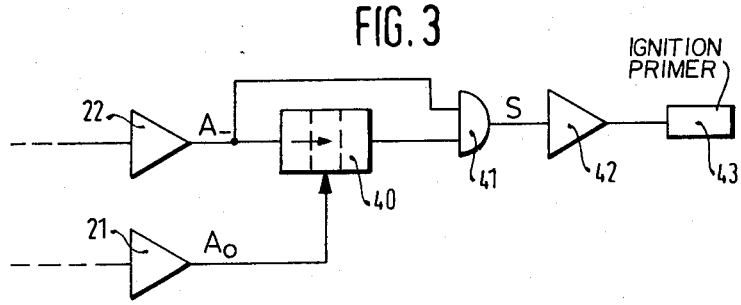
FIG. 3 shows a circuit for evaluating the signals generated by the exemplary embodiment according to FIG. 1.

The above-described monitoring can by way of example be performed with a circuit such as that shown in one exemplary embodiment in FIG. 3.

Here the deceleration signal A_ furnished by the amplifier 22 is carried both to a timing element 40 (that is, a retriggerable monostable multivibrator) having a retarded leading edge and directly to an AND gate 41, the further input of which is connected with the output of the timing element 40, the timing element 40 being resettable by the output of the amplifier 21 Thus the trigger signal S appears at the output of the AND gate 41 and is carried via an amplifier 42 to an ignition primer capsule 43, which in the case of a passenger protection device in a motor vehicle causes the inflation of an air bag.

The timing element 40 is dimensioned such that a signal appears at its output only following a duration Δt following the appearance of a signal at its input. Thus the AND gate 41 would not be switched through until the signal A_ had prevailed for a time longer than Δt, so that the trigger signal S as shown in FIGS. 2b and 2c is generated only at such a time.

It will be understood that the exemplary embodiment of a sensor described above has been explained in terms of its use with a passenger protection device in a motor vehicle merely by way of example but not of limitation. It is self-evident that a sensor of such a kind can also be used for other purposes known per se, in which accelerations and decelerations must be measured.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A sensor for detecting acceleration, in particular for triggering passenger protection devices in motor vehicles, comprising a spring-restrained inertial mass the deflection of which is measured with reference to a fixed reference point upon the action of an acceleration thereon, said mass including a first photoconductor, one end of which is acted upon by a light source and the other end of which is located opposite further photoconductors connected to respective photo detection means in dependence upon the deflection of said mass, and means generating a trigger signal in response to said detection means upon the exceeding of an acceleration threshold value.

2. A sensor as defined by claim 1, wherein said inertial mass comprises said photoconductor itself, which has one free end acting as the spring/mass system.

3. A sensor as defined by claim 1, further comprising means for monitoring the duration of the exceeding of said acceleration threshold value, whereby said trigger signal is generated upon the attainment of a predetermined duration.

4. A sensor as defined by claim 2, further comprising means for monitoring the duration of the exceeding of said acceleration threshold value, whereby said trigger signal is generated upon the attainment of a predetermined duration.

5. A sensor as defined by claim 3, wherein said photodetection means corresponding to a predetermined negative acceleration is connected both directly and also via a delaying means to inputs of an AND gate, the output of said AND gate being connected to an ignition primer capsule means of a passenger protection device.

6. A sensor as defined by claim 4, wherein said photodetection means corresponding to a predetermined negative acceleration is connected both directly and also via a delaying means to inputs of an AND gate, the output of said AND gate being connected to an ignition primer capsule means of a passenger protection device.

* * * * *